(12) United States Patent
Liu et al.

(10) Patent No.: US 12,061,564 B2
(45) Date of Patent: *Aug. 13, 2024

(54) NETWORK-ON-CHIP DATA PROCESSING BASED ON OPERATION FIELD AND OPCODE

(71) Applicant: Shanghai Cambricon Information Technology Co., Ltd., Pudong New Area (CN)

(72) Inventors: Shaoli Liu, Pudong New Area (CN); Zhen Li, Pudong New Area (CN); Yao Zhang, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,560

(22) Filed: Dec. 29, 2021

(65) Prior Publication Data

US 2022/0121603 A1 Apr. 21, 2022

Related U.S. Application Data

(63) Continuation of application No. 17/278,812, filed as application No. PCT/CN2019/111977 on Oct. 18, 2019.

(30) Foreign Application Priority Data

Oct. 18, 2018 (CN) .......................... 201811215820.7
Oct. 18, 2018 (CN) .......................... 201811215978.4
(Continued)

(51) Int. Cl.
*G06F 13/40* (2006.01)
*G06N 3/04* (2023.01)

(52) U.S. Cl.
CPC ........... *G06F 13/4068* (2013.01); *G06N 3/04* (2013.01)

(58) Field of Classification Search
CPC .. G06F 13/4068; G06F 15/161; G06F 9/3891; G06F 9/3828; G06N 3/04
See application file for complete search history.

(56) References Cited

U.S. PATENT DOCUMENTS 7,353,362 B2 4/2008 Georgiou et al.
8,966,222 B2 2/2015 Pakhunov et al.
(Continued)

FOREIGN PATENT DOCUMENTS

CN 101227486 A 7/2008
CN 102075578 A 5/2011
(Continued)

OTHER PUBLICATIONS

KR 10-2020-7034126—Office Action, mailed on Jul. 25, 2022, 13 pages.
(Continued)

*Primary Examiner* — Farley Abad
*Assistant Examiner* — Richard B Franklin
(74) *Attorney, Agent, or Firm* — Getech Law LLC; Jun Ye

(57) ABSTRACT

The present application relates to a network-on-chip data processing method. The method is applied to a network-on-chip processing system, the network-on-chip processing system is used for executing machine learning calculation, and the network-on-chip processing system comprises a storage device and a calculation device. The method comprises: accessing the storage device in the network-on-chip processing system by means of a first calculation device in the network-on-chip processing system and obtaining first operation data; performing an operation on the first opera- (Continued)

tion data by means of the first calculation device to obtain a first operation result; and sending the first operation result to a second calculation device in the network-on-chip processing system. According to the method, operation overhead can be reduced and data read/write efficiency can be improved.

10 Claims, 9 Drawing Sheets

(30) Foreign Application Priority Data

| Oct. 18, 2018 | (CN) | 201811216718.9 |
|---|---|---|
| Oct. 18, 2018 | (CN) | 201811216857.1 |
| Nov. 21, 2018 | (CN) | 201811390409.3 |
| Nov. 21, 2018 | (CN) | 201811390428.6 |
| Nov. 21, 2018 | (CN) | 201811392232.0 |
| Nov. 21, 2018 | (CN) | 201811392262.1 |
| Nov. 21, 2018 | (CN) | 201811392270.6 |
| Nov. 21, 2018 | (CN) | 201811392279.7 |
| Nov. 21, 2018 | (CN) | 201811393352.2 |

(56) References Cited

U.S. PATENT DOCUMENTS

| 10,936,942 B2 | 3/2021 | Dasari et al. |
|---|---|---|
| 11,514,291 B2 * | 11/2022 | Baum .................. G06N 3/045 |
| 2009/0128571 A1 | 5/2009 | Smith et al. |
| 2011/0075596 A1 | 3/2011 | Moreira et al. |
| 2012/0083338 A1 | 4/2012 | Decasa et al. |
| 2012/0303848 A1 | 11/2012 | Vallapaneni et al. |
| 2012/0303933 A1 | 11/2012 | Manet et al. |
| 2015/0358393 A1 | 12/2015 | Pande |
| 2017/0083338 A1 | 3/2017 | Burger et al. |
| 2017/0147513 A1 | 5/2017 | Hilton et al. |
| 2017/0308383 A1 * | 10/2017 | Espasa .............. G06F 9/30145 |
| 2018/0004518 A1 | 1/2018 | Plotnikov et al. |
| 2018/0293692 A1 | 10/2018 | Koker et al. |
| 2022/0156215 A1 | 5/2022 | Zhang et al. |

FOREIGN PATENT DOCUMENTS

| CN | 102591759 A | 7/2012 |
|---|---|---|
| CN | 102868644 A | 1/2013 |
| CN | 103218208 A | 7/2013 |
| CN | 103580890 A | 2/2014 |
| CN | 105183662 A | 12/2015 |
| CN | 107316078 A | 11/2017 |
| CN | 107578095 A | 1/2018 |
| CN | 107920025 A | 4/2018 |
| CN | 107992329 A | 5/2018 |
| CN | 108427990 A | 8/2018 |
| CN | 108431770 A | 8/2018 |
| CN | 108470009 A | 8/2018 |
| JP | H01179515 A | 7/1989 |
| JP | H04507027 A | 12/1992 |
| JP | H05274455 A | 10/1993 |
| JP | H09120391 A | 5/1997 |
| JP | 2738141 B2 | 4/1998 |
| JP | 2001501755 A | 2/2001 |
| JP | 2006286002 A | 10/2006 |
| JP | 2008301109 A | 12/2008 |
| JP | 2015509183 A | 3/2015 |
| JP | 2018514872 A | 6/2018 |
| KR | 100520807 B1 | 10/2005 |
| KR | 1020100044278 A | 4/2010 |
| KR | 1020100125331 A | 11/2010 |
| KR | 101306354 B1 | 9/2013 |
| KR | 1020160127100 A | 11/2016 |
| KR | 1020170125396 A | 11/2017 |
| WO | 2015087424 A1 | 6/2015 |
| WO | 2017185418 A1 | 11/2017 |
| WO | 2018103736 A1 | 6/2018 |
| WO | 2018126073 A1 | 7/2018 |

OTHER PUBLICATIONS

KR 10-2020-7034138—Office Action, mailed on Jul. 19, 2022, 15 pages.
CN 201811215820.7—First Office Action, mailed Aug. 26, 2021, 31 pages. (with English translation).
CN 201811215978.4—First Office Action, mailed Aug. 26, 2021, 32 pages. (with English translation).
CN 201811216718.9—First Office Action, mailed Aug. 26, 2021, 21 pages. (with English translation).
CN 201811390409.—First Office Action, mailed Feb. 20, 2021, 10 pages. (with English translation).
CN 201811392232.0—First Office Action, mailed Feb. 10, 2021, 11 pages. (with English translation).
CN 201811392270.6—First Office Action, mailed Aug. 18, 2021, 12 pages. (with English translation).
JP 2020206272—Notice of Reasons for Refusal, mailed Nov. 24, 2021, 7 pages. (with English translation).
JP 2020206281—Notice of Reasons of Refusal, mailed Dec. 9, 2021, 8 pages. (with English translation).
JP 2020206293—Notice of Reasons for Refusal, mailed Dec. 9, 2021, 8 pages. (with English translation).
JP 2020206306—Notice of Reasons for Refusal, mailed Dec. 9, 2021, 8 pages. (with English translation).
JP 2020569113—Notice of Reasons for Refusal, mailed Nov. 24, 2021, 7 pages. (with English translation).
EP 19873122.6—Extended European Search Report, mailed May 20, 2022, 13 pages.
EP 21217802.4—Extended European Search Report, mailed May 3, 2022, 11 pages.
EP 21217809.9—Extended European Search Report, mailed May 10, 2022, 11 pages.
EP 21217811.5—Extended European Search Report, mailed May 9, 2022, 11 pages.
KR 10-2020-7034133—Notification of Reason for Refusal, mailed Jul. 14, 2022, 11 pages.
CN201811216857.1—Chinese Office Action mailed on Jan. 3, 2023, 22 pages. (With Brief English Explanation).
Ebrahimi et. al., "Cluster-based topologies for 3D Networks-on-Chip using advanced inter-layer bus architecture", Journal of Computer and System Sciences, vol. 79, Issue 4, Jun. 2013, pp. 475-491.
PCT/CN2019/111977—International Search Report and Written Opinion mailed on Jan. 22, 2020, 13 pages.
KR20207034126—Written Decision on Registration mailed on May 8, 2023, 6 pages.
KR20207034133—Written Decision on Registration mailed on May 8, 2023, 6 pages.
KR20207034138—Written Decision on Registration mailed on May 8, 2023, 6 pages.
KR20207034145—Written Decision on Registration mailed on May 8, 2023, 6 pages.
CN201811216857.1—Second Office Action mailed on Jun. 1, 2023, 19 pages. (With Brief English Explanation).
U.S. Appl. No. 17/564,529—Notice of Allowance mailed on Sep. 20, 2023, 7 pages.
U.S. Appl. No. 17/564,529—Notice of Allowance mailed on Oct. 4, 2023, 7 pages.
U.S. Appl. No. 17/564,509—Notice of Allowance mailed on Aug. 16, 2023, 4 pages.
U.S. Appl. No. 17/564,509—Notice of Allowance mailed on Jul. 28, 2023, 7 pages.
U.S. Appl. No. 17/564,492—Notice of Allowance mailed on Sep. 20, 2023, 7 pages.
U.S. Appl. No. 17/564,431—Notice of Allowance mailed on Sep. 22, 2023, 9 pages.
U.S. Appl. No. 17/564,411—Notice of Allowance mailed on Aug. 30, 2023, 5 pages.

(56) References Cited

OTHER PUBLICATIONS

U.S. Appl. No. 17/564,411—Notice of Allowance mailed on Jul. 13, 2023, 8 pages.
U.S. Appl. No. 17/564,398—Notice of Allowance mailed on Sep. 18, 2023, 7 pages.
U.S. Appl. No. 17/564,398—Corrected Notice of Allowability mailed on Oct. 2, 2023, 3 pages.
U.S. Appl. No. 17/564,389—Notice of Allowance mailed on Jul. 31, 2023, 7 pages.
U.S. Appl. No. 17/564,389—Corrected Notice of Allowability mailed on Aug. 18, 2023, 2 pages.
U.S. Appl. No. 17/564,366—Notice of Allowance mailed on Dec. 28, 2023, 9 pages.
U.S. Appl. No. 17/564,366—Non-Final Office Action mailed on May 11, 2023, 11 pages.
U.S. Appl. No. 17/564,398—Non-Final Office Action mailed on Mar. 16, 2023, 14 pages.
U.S. Appl. No. 17/564,389—Non-Final Office Action mailed on Mar. 15, 2023, 15 pages.
U.S. Appl. No. 17/564,492—Non-Final Office Action mailed on Mar. 28, 2023, 10 pages.
U.S. Appl. No. 17/564,431—Non-Final Office Action mailed on Mar. 17, 2023, 9 pages.
U.S. Appl. No. 17/564,411—Non-Final Office Action mailed on Mar. 10, 2023, 15 pages.
U.S. Appl. No. 17/564,509—Non-Final Office Action mailed on Mar. 10, 2023, 12 pages.
U.S. Appl. No. 17/564,529—Non-Final Office Action mailed on Mar. 10, 2023, 10 pages.
U.S. Appl. No. 17/278,812—Non-Final Office Action mailed on Mar. 14, 2024, 13 pages.
Xu et al., "A Seed-driven Bottom-up Machine Learning Framework for Extracting Relations of Various Complexity", Proceedings of the 45th Annual Meeting of the Association for Computational Linguistics, Jun. 2007, pp. 584-591.

* cited by examiner

NETWORK-ON-CHIP DATA PROCESSING BASED ON OPERATION FIELD AND OPCODE

CROSS REFERENCES

This application is a continuation of U.S. patent application Ser. No. 17/278,812, filed Mar. 23, 2021, which is a 371 of International Application PCT/CN2019/111977, filed Oct. 18, 2019, which claims the benefit of priority from Chinese Application No. 201811216718.9 with the title of "Network-On-Chip Processing System and Network-On-Chip Data Processing Method", Chinese Application No. 201811215820.7 with the title of "Network-On-Chip Processing System and Network-On-Chip Data Processing Method", Chinese Application No. 201811215978.4 with the title of "Network-on-Chip Processing System and Network-on-Chip Data Processing Method", and Chinese Application No. 201811216857.1 with the title of "Network-on-Chip Data Processing Method, Storage Medium, Computer Equipment and Device", all of which were filed on Oct. 18, 2018; this application also claims the benefit of priority from Chinese Application No. 201811392232.0 with the title of "Data Processing Method, Device, and Related Product", Chinese Application No. 201811392262.1 with the title of "Data Processing Method, Device, and Related Product", Chinese Application No. 201811392279.7 with the title of "Data Processing Device, Method, and Related Product", Chinese Application No. 201811393352.2 with the title of "Data Processing Device, Method, and Related Product", Chinese Application No. 201811390409.3 with the title of "Data Processing Device, Method, and Related Product", Chinese Application No. 201811390428.6 with the title of "Data Processing Device and Related Product", and Chinese Application No. 201811392270.6 with the title of "Data Processing Device and Related Product", all of which were filed on Nov. 21, 2018. The disclosures of the above applications are incorporated herein by reference in their entirety.

TECHNICAL FIELD

The present disclosure relates to the field of information processing technology, and particularly relates to a network-on-chip data processing method and device.

BACKGROUND

With the development of semi-conductor technology, it has become a reality to integrate hundreds of millions of transistors on a single chip. The network-on-chip (NoC) is capable of integrating plenty of computation resources on a single chip and implementing on-chip communication.

As plenty of computations are required in a neural network, some of the computations, such as a forward operation, a backward operation, and weight update, need to be processed in parallel. In a chip architecture with a large number of transistors, chip design may face problems such as high memory access overhead, high bandwidth blockage, and low data reading/writing efficiency.

SUMMARY

In order to at least overcome the problems existing in the related technology to a certain extent, the present disclosure provides an interaction method, a device, and a smart terminal.

An embodiment of the present disclosure provides a network-on-chip (NoC) processing system. The system includes: a storage device and a plurality of computation devices, where the storage device and the plurality of computation devices are arranged on a same chip. At least one computation device is connected to the storage device, and at least two computation devices are connected to each other.

In an embodiment, any two of the plurality of computation devices are directly connected to each other.

In an embodiment, the plurality of computation devices include a first computation device and a plurality of second computation devices, where the first computation device is connected to the storage device, and at least one of the plurality of second computation devices is connected to the first computation device.

In an embodiment, at least two of the plurality of second computation devices are connected to each other, and are connected to the storage device through the first computation device.

In an embodiment, any two of the plurality of second computation devices are directly connected to the first computation device.

In an embodiment, each of the plurality of computation devices is connected to the storage device, and at least two computation devices are connected to each other.

An embodiment of the present disclosure provides a data processing method, where the method includes:
  receiving a data operation signal sent by an internal or external device, where the data operation signal includes an operation field and an opcode, where the opcode includes a first-type flag bit, and the operation field includes a second-type flag bit. The first-type flag bit is used to indicate whether the data operation signal is an I/O instruction, and the second-type flag bit is used to indicate whether the data operation signal is a broadcast or multicast instruction in the I/O instruction; and
  performing a corresponding operation according to the data operation signal on data to be operated in the memory to obtain required input data.

In an embodiment, the operation field further includes a data reception flag bit which is used to indicate a device or a processing circuit that receives the input data.

In an embodiment, a count of data reception flag bits represents a count of devices or processing circuits that can interact with the memory.

In an embodiment, the operation field further includes information of data to be operated, where the information of the data to be operated includes a source address of the data to be operated in the memory, a length of the data to be operated, and a data return address after the data is operated; the performing a corresponding operation on the data to be operated in the memory according to the data operation signal to obtain the required input data includes:
  reading the memory from the source address to obtain input data that satisfies the data length;
  determining a device or a processing circuit that receives the input data according to the data reception flag bit; and
  according to the data return address, returning the input data to a storage space corresponding to the data return address in the device or processing circuit.

In an embodiment, the operation field further includes a jump sub-operation-field, where the jump sub-operation-field includes a jump stride and a jump data length which is obtained after each jump operation is performed; the reading the memory from the source address to obtain input data that satisfies the data length includes:
reading the memory from the source address, and obtaining first jump data according to a jump data length after a current jump;
obtaining a last address of the jump data, and jumping from the last address to a target jump address according to the jump stride; and
starting from the target jump address, obtaining second jump data according to a length of jump data after the jump until the length of the jump data obtained after each jump satisfies the data length.

In an embodiment, the jump sub-operation-field includes a stride operation field and/or a segment operation field, where the stride operation field is used to indicate a stride for each jump of the data operation signal, and the segment operation field is used to indicate a preset size for each segment of the data operation signal.

In an embodiment, the operation field further includes a function flag bit which is used to indicate a processing operation performed on data that is read.

In an embodiment, the method further includes:
if a value of the first-type flag bit is I/O, determining that the data operation signal is an I/O instruction; and
if a value of the second-type flag bit is 1, determining that the data operation signal is a broadcast or multicast instruction in the I/O instruction.

In an embodiment, the receiving a data operation signal sent by an internal or external device includes:
parsing the data operation signal to obtain a type flag bit of the data operation signal and information of data to be operated; and
executing the parsed data operation signal according to an instruction queue, where the instruction queue is used to indicate an execution order of the data operation signal.

In an embodiment, before executing the parsed data operation signal according to the instruction queue, the method further includes:
determining a dependency of adjacent parsed data operation signals to obtain a determination result, where the dependency represents whether there is an association between an $s^{th}$ data operation signal and an $s-1^{th}$ data operation signal before the $s^{th}$ data operation signal; and
if the determination result is that there is an association between the $s^{th}$ data operation signal and the $s-1^{th}$ data operation signal, caching the $s^{th}$ data operation signal, and after the $s-1^{th}$ data operation signal is executed, fetching the $s^{th}$ data operation signal.

In an embodiment, the determining the dependency of adjacent parsed data operation signals includes:
obtaining a first storage address interval of required data in the $s^{th}$ data operation signal fetched according to the $s^{th}$ data operation signal, and obtaining a zeroth storage address interval of required data in the $s-1^{th}$ data operation signal fetched according to the $s-1^{th}$ data operation signal, respectively;
if the first storage address interval and the zeroth storage address interval have an overlapping area, determining that there is a dependency between the $s^{th}$ data operation signal and the $s-1^{th}$ data operation signal; and
if the first storage address interval and the zeroth storage address interval do not have an overlapping area, determining that there is no dependency between the $s^{th}$ data operation signal and the $s-1^{th}$ data operation signal.

An embodiment of the present disclosure provides a neural network operation device, where the device includes a processor and a memory. The memory stores a computer program, and the processor implements the following steps when executing the computer program:
receiving a data operation signal sent by an internal or external device, where the data operation signal includes an operation field and an opcode; the opcode includes a first-type flag bit, and the operation field includes a second-type flag bit; the first-type flag bit is used to indicate whether the data operation signal is an I/O instruction, and the second-type flag bit is used to indicate whether the data operation signal is a broadcast or multicast instruction in the I/O instruction; and
performing a corresponding operation according to the data operation signal on data to be operated in the memory to obtain required input data.

In an embodiment, the input data includes input neuron data and/or weight data; and the output data includes output neuron data.

An embodiment of the present disclosure provides a neural network operation device, where the operation device includes one or more computation devices in the Noc processing system. The neural network operation device is configured to obtain data to be operated and control information from other processing devices, execute a specified machine learning operation, and transfer an execution result to other processing devices through an I/O interface.

When the neural network operation device includes a plurality of the computation devices, the plurality of computation devices may be interconnected and transfer data to each other through a specific structure, where
the plurality of computation devices are interconnected and transfer data to each other through a PCIE bus to support a larger-scale machine learning operation; the plurality of computation devices share a same control system or have respective control systems; the plurality of computation devices share a memory or have respective memories; and an interconnection mode of the plurality of computation devices is any interconnection topology.

An embodiment of the present disclosure provides a combined processing device, where the combined processing device includes the neural network operation device, a universal interconnection interface, and other processing devices. The neural network operation device interacts with the other processing devices to jointly complete operations specified by a user. The combined processing device may also include a storage device, where the storage device is connected to the neural network operation device and the other processing devices respectively, and the storage device is configured to store data of the neural network computation device and the other processing devices.

An embodiment of the present disclosure provides a neural network chip, where the chip includes the computation device in the NoC processing system, the neural network computation device, or the combined processing device.

An embodiment of the present disclosure provides a neural network chip package structure, where the package structure includes the neural network chip.

An embodiment of the present disclosure provides a board card, where the board card includes the neural network chip package structure.

An embodiment of the present disclosure provides an electronic device, where the electronic device includes the neural network chip or the board card.

It should be understood that the above general descriptions and the following detailed descriptions are only exemplary and illustrative, and are not intended to limit the present disclosure.

BRIEF DESCRIPTION OF THE DRAWINGS

The accompanied drawings herein are incorporated into the specification and constitute a part of the specification, illustrate embodiments that conform to the present disclosure, and are used together with the specification to explain principles of the present disclosure.

DETAILED DESCRIPTION OF THE EMBODIMENTS

The exemplary embodiments will be described in detail, and examples thereof are shown in the accompanied drawings. Unless otherwise indicated, identical numbers in different drawings indicate identical or similar elements. The implementation manners described in the following exemplary embodiments do not represent all implementation manners consistent with the present disclosure. On the contrary, the implementation manners are only examples of devices and methods which are consistent with some aspects of the present disclosure and specifically described in the appended claims.

With the continuous development of information technology, the demand for data access and data processing becomes higher, which leads to higher requirements for processors that process data and access data. For example, for a general-purpose processor, a multi-core processor composed of a plurality of general-purpose processor cores (such as CPU cores) has become a mainstream thanks to its powerful parallel computation capabilities.

However, with continuous development of artificial neural networks, machine learning chips with more architectures gradually come out. These machine learning chips need to access data or process data in the shared storage according to instructions during operation. When there is a large amount of data involved in data access or in the shared storage, instructions of the machine learning chips gradually become complicated, which affects the speed of reading the shared storage through instructions and thus results in low efficiency of neuron data processing.

Therefore, how to improve accelerate access speed of a machine learning chip during data access has become an urgent technical problem to be solved by current technicians.

To solve the above problem, the present disclosure provides the following technical solutions.

Figure 1:
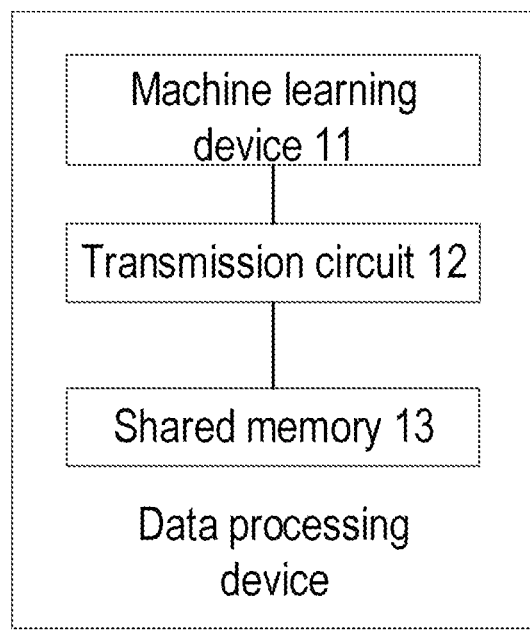
FIG. 1 is a diagram of application environment of a data processing method according to an embodiment.

The data processing method provided in the present disclosure may be applied to the hardware circuit shown in FIG. 1. The circuit includes: a machine learning device 11, a transmission circuit 12, and a shared memory 13, where the machine learning device 11 and the transmission circuit 12 are connected through an interface, and the transmission circuit 12 and the shared memory 13 are connected through an interface. The machine learning device 11, the transmission circuit 12, the shared memory 13 and the interfaces may all be implemented by a hardware circuit. For example, the machine learning device may be a device with arithmetic function formed by a plurality of machine learning units (MLU), the transmission circuit may be a broadcast bus, and the shared memory may be a non-volatile and/or volatile memory, including but not limited to a random access memory (RAM), a scratchpad memory, and the like. The form of the above hardware is not limited in the present disclosure. The transmission circuit 12 is configured to obtain input data required by the machine learning device 11 from the shared memory 13 according to a data operation signal sent by the machine learning device 11, and return the input data to the machine learning device 11. The machine learning device 11 is configured to perform a machine learning operation according to the input data to obtain output data, use the output data as new input data, and transfer the data to the shared memory 13 for data storage through the transmission circuit 12.

In order to make the purposes, technical schemes, and technical effects of the present disclosure clearer, the present disclosure will be described hereinafter with reference to the accompanied drawings and embodiments. It should be understood that the embodiments described here are merely used for explaining the present disclosure, rather than limiting the present disclosure. The data processing method provided in the embodiment of the present disclosure aims to solve a technical problem of how to improve access speed of a machine learning chip in data access when there is a large amount of data involved in data access or shared storage. The technical solutions of the present disclosure and how the technical solutions solve the above technical problems will be described in detail hereinafter with reference to the embodiments and the accompanied drawings. The following specific embodiments may be combined with each other, and identical or similar concepts or processes may not be further described in some embodiments. It should be noted that an executive body of the data processing method provided in the present disclosure is a transmission circuit and may also be a data processing device, where the device may be implemented by software, hardware, or a combination of software and hardware to be part or all of a data analysis terminal.

Figure 2:
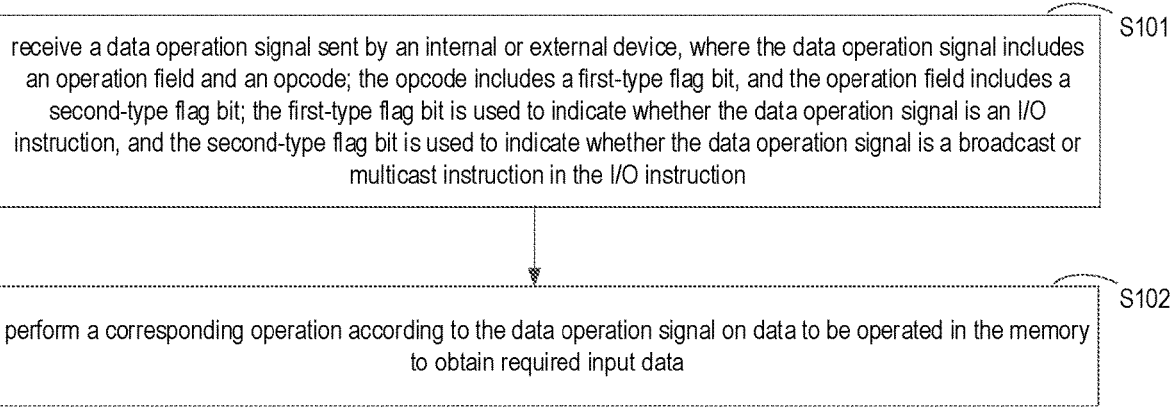
FIG. 2 is a flowchart of a data processing method according to an embodiment.

In an embodiment, FIG. 2 provides a data processing method. This embodiment describes a process of the transmission circuit determining a type of the data operation signal according to a first-type flag bit and a second-type flag bit of the data operation signal, and obtaining required data from the memory according to a corresponding operation of the determined type to improve the access speed. The method shown in FIG. 2 includes:

a step S101, receiving a data operation signal sent by an internal or external device, where the data operation signal includes an operation field and an opcode; the opcode includes a first-type flag bit, and the operation field includes a second-type flag bit; the first-type flag bit is used to indicate whether the data operation signal is an I/O instruction, and the second-type flag bit is used to indicate whether the data operation signal is a broadcast or multicast instruction in the I/O instruction.

In this embodiment, the transmission circuit receives a data operation signal sent by an internal or external device, and the data operation signal carries the first-type flag bit and the second-type flag bit of the data operation signal, where the internal or external device may be a machine learning device connected to the transmission circuit through an interface. The machine learning device may be implemented in any form of hardware such as a device with arithmetic functions composed by a plurality of MLUs. The transmission circuit may determine whether a value of the data operation signal is an I/O instruction according to the first-type flag bit of the data operation signal carried by the data operation signal, and the second-type flag bit, and may determine whether the data operation signal is a specific type of the I/O instruction. For example, if the value of the first-type flag bit of the data operation signal is an I/O instruction, and the value of the second-type flag bit is 1, then the data operation signal is a broadcast or multicast instruction in the I/O instruction.

The method further includes a step S102, performing a corresponding operation according to the data operation signal on data to be operated in the memory to obtain required input data.

Based on the data operation signal sent from the internal or external device to the transmission circuit in the above step S101, the transmission circuit performs a corresponding operation on data to be operated in the memory according to a type flag bit of the data operation signal to obtain required input data such as neuron data and weight data. The neuron data and weight data are data required by an internal or external device. For example, when the internal or external device is a machine learning device, the neuron data and weight data are input data required when the machine learning device performs a machine learning operation. The above data may be data pre-stored in the memory, or may be data output by the machine learning device after the machine learning operation is executed, which is not limited herein.

The data processing method provided in this embodiment, the transmission circuit performs a corresponding operation on the data to be operated in the memory according to the data operation signal carrying the first-type flag bit and the second-type flag bit sent by an internal or external device, and obtains the required input data. In this embodiment, since the data operation signal carries the first-type flag bit and the second-type flag bit, the transmission circuit may determine a specific type of the data operation signal according to the first-type flag bit and the second-type flag bit of the data operation signal after receiving the data operation signal, and then perform a corresponding operation on the data to be operated in the memory. In this way, classification of the type flag bits of the data operation signal may quickly locate a corresponding operation, which may simplify the data access logic, improve the data access efficiency, and greatly improve the access speed of the machine learning chip during data access.

Several embodiments are used to introduce the opcode and the operation field, as well as relationships among the opcode, the operation field, the type flag bit of the data operation signal, information of data to be operated, and the data reception flag bit.

In an embodiment, the operation field further includes a data reception flag bit which is used to indicate a device or a processing circuit that receives the input data. Optionally, a count of data reception flag bits represents a count of devices or processing circuits that can interact with the memory. Optionally, if a value of the first-type flag bit is I/O, the data operation signal is determined to be an I/O instruction; if a value of the second-type flag bit is 1, the data operation signal is determined to be a broadcast or multicast instruction in the I/O instruction.

In this embodiment, the opcode of the data operation signal is used to indicate an operation type of the data operation signal, which includes the first-type flag bit of the data operation signal. The operation field is used to store required data information of the data operation signal during execution, which includes the second-type flag bit. For example, if the value of the first-type flag bit of the data operation signal in the opcode is I/O, then the data operation signal is an I/O instruction; if the value of the second-type flag bit of the data operation signal is 1, then the data operation signal is a broadcast or multicast instruction in the I/O instruction. It should be noted that determining the data operation signal to be a broadcast or multicast instruction in the I/O instruction if the value of the second-type flag bit in this embodiment is 1 is only an implementation. According to actual needs of the user, the data operation signal may also be determined to be a broadcast or multicast instruction in the I/O instruction if the value of the second type flag is 0 or other identifiers, which is not limited herein. The data receiving flag indicates a device or a processing circuit that can input data (such as input neuron data and weight data) in an internal or external device. The device may be a machine learning device or an MLU, and the processing circuit may be an operation unit, or a primary processing circuit or a secondary processing circuit of the operation unit, which is not limited herein. A count of data reception flag bits represents a count of devices or processing circuits that can interact with the memory. For example, if there are 3 MLUs (machine learning units) in the data reception flag bits in the operation field are flagged as 1, then the 3 MLUs can receive data; and if one MLU is flagged as 0, then the one MLU cannot receive data. It should be noted that the MLU that receives data being flagged as 1 is just an embodiment. The user can flag the MLU that can receive data as 0 or other identifiers according to actual needs, which is not limited herein.

In this way, the transmission circuit may determine a specific type of the data operation signal according to the first-type flag bit and the second-type lag bit of the data operation signal, locate a corresponding operation, and determine a target device for sending operated data according to the data reception flag bit, which may simplify the data access logic, improve the data access efficiency, and greatly improve the access speed of the machine learning chip during data access.

Figure 3:
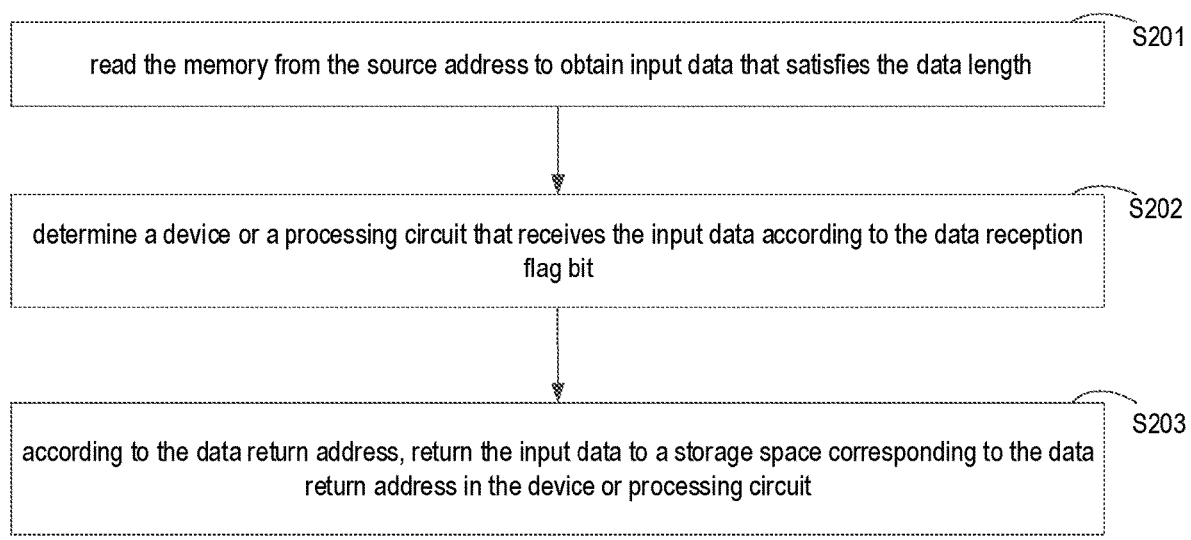
FIG. 3 is a flowchart of a data processing method according to an embodiment.

In another embodiment, the operation field further includes information of data to be operated, where the information of the data to be operated includes a source address of the data to be operated in the memory, a length of the data to be operated, and a data return address after the data is operated. As shown in FIG. 3, a data processing method is provided, and this embodiment includes a specific process of a transmission circuit reading data in the memory according to data information carried in the data operation signal and returning read data to a device or a processing circuit according to the data operation information. The above step S2102 includes:

a step S201, reading the memory from the source address to obtain input data that satisfies the data length.

In this embodiment, since the information of the data to be operated of the data operation signal carries the source address of the data to be operated in the memory, the length of the data to be operated, and the data return address of the operated data, the transmission circuit starts to read data from the source address in the memory, and reads data that satisfies a length of data to be operated according to a preset rule, where the length of the data to be operated is set by the user according to actual situations, which is not limited herein. The above step of the transmission circuit obtaining input data and data that satisfy the data length specifically includes reading data that satisfies the data length from the memory according to the preset rule. The preset rule is set by the user according to actual situations, which is not limited herein. For example, the data may be read one by one starting from the source address until a length of the read data satisfies the data length.

The step S101 further includes a step S202, determining a device or a processing circuit that receives the input data according to the data reception flag bit.

Based on the input data that satisfies the data length obtained by the transmission circuit in the above step S201, the transmission circuit determines a device or a processing circuit to which the data is returned according to the data reception flag bit in the data signal. For example, when the device is a machine learning device, the transmission circuit determines that the data is returned to one or more target machine learning units in the machine learning device according to the data reception flag bit.

The step S101 further includes S203, according to the data return address, returning the input data to a storage space corresponding to the data return address in the device or processing circuit.

In this step, based on the device or the processing circuit to which the data is to be returned and that is determined in the above steps, the transmission circuit returns the input data to a storage space corresponding to the data return address in the device or processing circuit according to the data return address in the information of the data to be operated in the data operation signal, where the data return address in the information of the data to be operated may be addresses in a plurality of target machine learning units in the machine learning device.

Optionally, as shown in the following Table 1 and on a basis of the above embodiments, if a value of the first-type flag bit is I/O, the data operation signal is determined to be an I/O instruction; if a value of the second-type flag bit of is 1, the data operation signal is determined to be a broadcast or multicast instruction in the I/O instruction. Correspondingly, if a value of the flag bit of the second type is 0, the data operation signal is determined not to be a broadcast or multicast instruction. The data information to be operated in the operation field includes a source address 0x110011, a destination address 0x000100, and a data length 0x0100. The data length is a length set by the user. The user may set the length to a value or a plurality of values, which is not limited herein. In the data reception flag bit in the operation field, three MLUs are flagged as 1, which means that the three MLUs may receive data; and one MLU is flagged as 0, which means that the MLU cannot receive data. Specifically, the transmission circuit reads data with a length of 0x0100 from the address 0x110011 in the shared memory according to the data operation signal, and then writes the data to the address 0x000100 of MLU3, MLU1, and MLU0 in the machine learning device.

TABLE 1

| | | Operation field | | | | | | |
|---|---|---|---|---|---|---|---|---|
| | Whether it is a broadcast/ | | | | | Data information | | |
| Opcode | multicast | Flag whether MLU receives data | | | | Source | Target | Data |
| I/O | instruction | MLU3 | MLU2 | MLU1 | MLU0 | address | address | length |
| I/O | 1 | 1 | 0 | 1 | 1 | 0x110011 | 0x000100 | 0x0100 |

In the data processing method provided in this embodiment, the transmission circuit starts reading the memory from the source address according to the data operation signal, obtains input data that satisfies the data length, determines the device or processing circuit that receives the input data according to the data reception flag bit, and then returns the input data to the storage space corresponding to the data return address in the device or processing circuit according to the data return address. In this embodiment, the transmission circuit reads data according to a reading rule indicated by data operation information in the data operation signal when obtaining input neuron data and weight data that satisfies the data length, which simplifies the data reading logic of the transmission circuit, improves the data access efficiency, and greatly improves the access speed of the machine learning chip during data access.

Optionally, in the embodiment shown in FIG. 3, the device includes at least one machine learning unit, where each machine learning unit includes a primary processing circuit and a plurality of secondary processing circuits. Data signal operations performed by the at least one machine learning unit (MLU) included in the machine learning device may share a same data receiving interface. The machine learning unit may be connected to the transmission circuit through a sending interface and a shared data receiving interface. It should be noted that both the sending interface and the shared data receiving interface may be implemented by hardware circuits, and types of the sending interface and the shared data receiving interface are not limited herein. Each machine learning unit includes a primary processing circuit and a plurality of secondary processing circuits, where the primary processing circuit is configured to distribute input data (neuron data and weight data) to the plurality of secondary processing circuits, and the plurality of secondary processing circuits are configured to perform intermediate operations in parallel according to the input data transferred by the primary processing circuit to obtain a plurality of intermediate results, and transfer the plurality of intermediate results to the primary processing circuit. In this way, the device may assign each of the above machine learning units to respectively process neurons in each machine learning unit and output corresponding output data. The above computation manner of performing a neural network computation in parallel layer by layer may realize parallel processing of neural network computation, which improves the processing efficiency.

Figure 4:
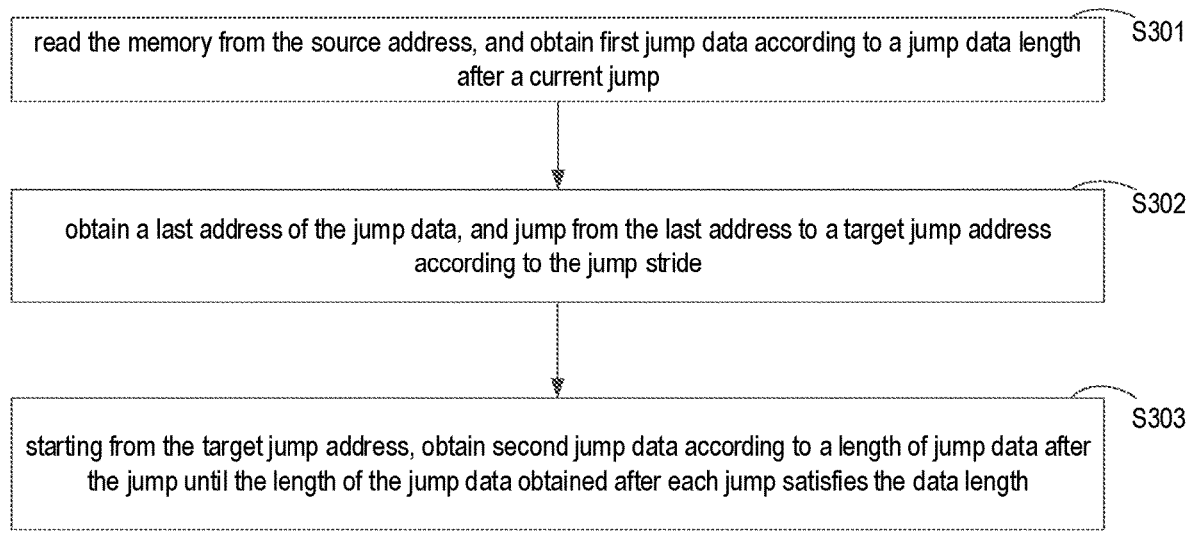
FIG. 4 is a flowchart of a data processing method according to an embodiment.

On the basis of the above embodiment, the operation field further includes a jump sub-operation-field, and the jump sub-operation-field includes a jump stride length and a jump data length operated after each jump. As shown in FIG. 4, a data processing method is provided, and this embodiment describes a specific process of a transmission circuit reading data in a memory according to a jump sub-operation field in an operation field. The above step S201 includes:

a step S301, reading the memory from the source address, and obtaining first jump data according to a jump data length after a current jump.

In this embodiment, the operation field of the data operation signal includes a jump sub-operation-field, where the jump sub-operation-field is used to instruct the transmission circuit to read information of the data to be operated according to the data operation signal and a rule of the sub-operation-field. Optionally, the jump sub-operation-field includes a stride operation field and/or a segment operation field, where the stride operation field is used to indicate a stride for each jump of the data operation signal, and the segment operation field is used to indicate a preset size for each segment of the data operation signal. It should be noted that for the stride operation field and the segment operation field, the length and the name in the embodiments of the present disclosure are only listed as examples, which are not limited herein. The jump sub-operation-field includes a jump stride and a jump data length operated after each jump, where the jump data length may be a preset data length. Specifically, the transmission circuit starts reading the memory from the source address in the information of the data to be operated, and after a current jump, determines data with a read jump data length to be first jump data. The first jump data refers to data obtained after the transmission circuit jumps data with a preset length when reading data, where the preset length is set by the user according to actual situations, which is not limited herein.

The above step S201 further includes a step S302, obtaining a last address of the jump data, and jumping from the last address to a target jump address according to the jump stride.

Based on the first jump data read in the step S301, the transmission circuit obtains a last address of the first jump data, and according to a jump stride in the jump sub-operation-field, starts jumping a length of the jump stride from the last address of the first jump data to a target jump address. It can be understood that a length between the last address of the first jump data and the target jump address is a jump stride in the jump sub-operation-field.

The above step S201 further includes a step S303, starting from the target jump address, obtaining second jump data according to a length of jump data after the jump until the length of the jump data obtained after each jump satisfies the data length.

In this step, during reading data, the transmission circuit starts jumping data with a preset length from the target jump address determined in the above step S302, and determines data obtained after the jump as second jump data. If the length between an address of the second jump data and the source address where the jump starts satisfies a length of data required by the machine learning device, it is indicated that the reading the data required by the machine learning device is completed. If the length between an address of the second jump data and the source address where the jump starts does not satisfy a length of data required by the machine learning device, the transmission circuit continues to jump from the last address of the second jump data according to a jump order in the above steps S301 to S303 to read the data until the length between the address of the second jump data and the source address where the jump starts satisfies the length of the data required by the machine learning device, it is indicated that the reading the data required by the machine learning device is completed).

For example, as shown in Table 2 below, a process of the transmission circuit reading data in this embodiment is as follows: if the operation field further includes a stride operation field, which is a jump sub-operation-field, the transmission circuit starts reading data in the shared memory from a source address 0x110011 in the data information in an order of reading data with a preset length (the preset length is less than a data length 0x0100 in the data information shown in the table below), jumping to an address of data with a stride length (0x0008), and then reading data with a preset length. The data is read in the above order until a total length of the data read is a data length 0x0100 in the data information shown in Table 2 below, then it is indicated that the data reading is completed. If the operation field further includes a segment operation field, which is a jump sub-operation-field, the transmission circuit starts reading data in the shared memory from a source address 0x110011 in the data information in an order of reading data with a preset length (the preset length is less than a data length 0x0100 in the data information shown in the table below), jumping to an address of data with a stride length (0x0008), and then reading data with a preset length. The data is read in the above order until a total length of the data read reaches a data length 0x0100 in the data information shown in Table 1 below, then it is indicated that the data reading is completed. It should be noted that if the jump sub-operation-field only includes the segment operation field without stride operation field, the transmission circuit starts reading data with a segment length (0x0010) from the source address 0x110011 when reading data until a total length of the data read reaches a data length 0x0100 in the data information shown in Table 2 below, then it is indicated that the data reading is completed.

TABLE 2

| | | Operation field | | | | | | |
|---|---|---|---|---|---|---|---|---|
| | | | | | Data information | | | Data jump |
| Opcode | Flag whether MLU receives data | | | | Source address | Target address | Data length | information |
| | | | | | | | | Stride | Segment |
| CAST | MLU3 | MLU2 | MLU1 | MLU0 | | | | | |
| CAST | 1 | 0 | 1 | 1 | 0x110011 | 0x000100 | 0x0100 | 0x0008 | 0x0010 |

In the data processing method provided in this embodiment, the transmission circuit starts reading the shared memory from the source address, obtains the first jump data according to the jump data length obtained after the current jump, starts jumping from the last address of the first jump data to the target jump address according to the jump stride, and then starting from the target jump address, obtains the second jump data according to the jump data length obtained after the jump until the jump data length obtained after each jump satisfies the data length. In this way, when the operation field includes the jump sub-operation-field, the transmission circuit reads data according to the jump rule of the sub-operation-field, which simplifies the data reading logic of the transmission circuit, improves the data access efficiency, and greatly improves the access speed of the machine learning chip during data access.

Figure 5:
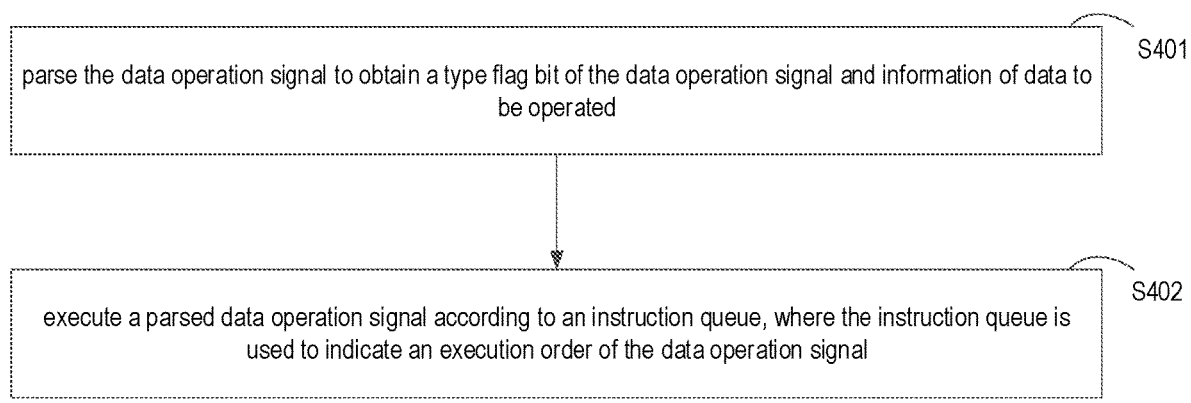
FIG. 5 is a flowchart of a data processing method according to an embodiment.

When the transmission circuit performs an operation according to a received data operation signal, the received data operation signal is an encoding instruction and needs to be first decoded and parsed. Therefore, an embodiment of the present disclosure provides a data processing method. As shown in FIG. 5, the method of the transmission circuit in the data processing device receiving a data operation signal sent by the machine learning device in the data processing device includes:

a step S401, parsing the data operation signal to obtain a type flag bit of the data operation signal and information of data to be operated.

It should be noted that there are generally a large number of data operation signals in the process of data processing. When the transmission circuit processes one of the data operation signals, other data operation signals need to be stored. Specifically, the transmission circuit parsing the data operation signal includes parsing data information carried in the data operation signal and the type flag bit of the data operation signal. The data operation information may include a length of data to be operated, a target address, an original address, and the like, which is not limited herein.

The method further includes a step S402, executing a parsed data operation signal according to an instruction queue, where the instruction queue is used to indicate an execution order of the data operation signal.

It should be understood that the data operation signal needs to be executed in order. In the above step S401, the transmission circuit parses the data operation signal to obtain data operation information and a type flag bit, and then the transmission circuit executes the parsed data operation signal according to an instruction queue.

In the data processing method provided in this embodiment, a transmission circuit parses a data operation signal to obtain a type flag bit of the data operation signal and information of data to be operated, and then the transmission circuit executes the parsed data operation signal according to an instruction queue. In this way, before executing the data operation signal, the transmission circuit parses the data operation signal first and then perform the execution in order, which greatly improves the speed of the transmission circuit performing an execution according to the data operation signal.

Figure 6:
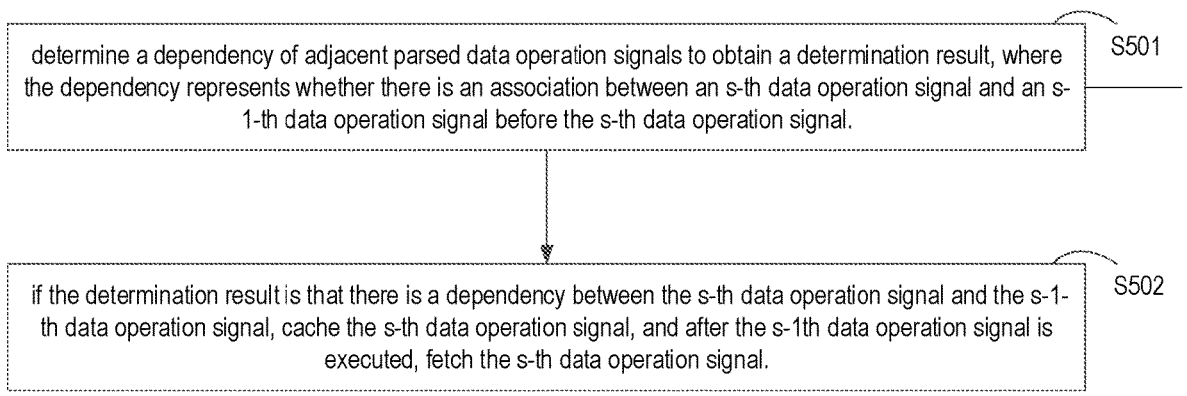
FIG. 6 is a flowchart of a data processing method according to an embodiment.

Since the transmission circuit needs to execute the data operation signals that are related to each other when executing the data operation signals in the sequence of the queue, the embodiment of the present application provides another embodiment, as shown in FIG. 6, in the transmission circuit, before executing the parsed data operation signal according to the instruction queue, the method further includes:

a step S501, determining a dependency of adjacent parsed data operation signals to obtain a determination result, where the dependency represents whether there is an association between an $s^{th}$ data operation signal and an $s-1^{th}$ data operation signal before the $s^{th}$ data operation signal.

The transmission circuit needs to determine a dependency of adjacent parsed data operation signals, and determine whether there is an association between the two adjacent data operation signals to be processed according to a determination result, where the $s^{th}$ data operation signal represents any signal in the data operation signals instead of a specific signal. The $s-1^{th}$ data operation signal represents a previous signal of the $s^{th}$ data operation signal.

Optionally, an implementation of the transmission circuit determining a dependency of the adjacent parsed data operation signals includes: fetching a first storage address interval of data required in the $s^{th}$ data operation signal according to the $s^{th}$ data operation signal, fetching a zeroth storage address interval of data required in the $s-1^{th}$ data operation signal according to the $s-1^{th}$ data operation signal, respectively; if the first storage address interval and the zeroth storage address interval have an overlapping area, determining that there is an association between the $s^{th}$ data operation signal and the $s-1^{th}$ data operation signal; and if the first storage address interval and the zeroth storage address interval do not have an overlapping area, determining that there is no association between the $s^{th}$ data operation signal and the $s-1^{th}$ data operation signal. Optionally, the transmission circuit determines a dependency of the adjacent parsed data operation signals according to a relationship between the first storage address interval of data required in the $s^{th}$ data operation signal and the zeroth storage address interval of the $s-1^{th}$ data operation signal; the determination manner may be: if the first storage address interval and the zeroth storage address interval do not have an overlapping area, determining that there is no dependency between the $s^{th}$ data operation signal and the $s-1^{th}$ data operation signal, and if the first storage address interval and the zeroth storage address interval have an overlapping area, determining that there is a dependency between the $s^{th}$ data operation signal and the $s-1^{th}$ data operation signal.

The method further includes a step S502, if the determination result is that there is a dependency between the $s^{th}$ data operation signal and the $s-1^{th}$ data operation signal, caching the $s^{th}$ data operation signal, and after the $s-1^{th}$ data operation signal is executed, fetching the $s^{th}$ data operation signal.

Based on the dependency of two adjacent data operation signals determined by the transmission circuit in the above steps, the data operation signals are executed in order; if the determination result is that there is a dependency between the $s^{th}$ data operation signal and the $s-1^{th}$ data operation signal, the transmission circuit first caches the $s^{th}$ data operation signal, and after the $s-1^{th}$ data operation signal is executed, fetches the $s^{th}$ data operation signal.

In the data processing method provided in this embodiment, the transmission circuit ensures continuity of the data operation signals by determining an association between two adjacent data operation signals. In this way, orderly preparations in the early stage ensure subsequent operations to be executed smoothly according to the data operation signal, which improves the data access efficiency and greatly improve the access speed of the machine learning chip during data access.

Since a format of data read by the transmission circuit according to the data operation signal is not a format required by the machine learning device, the transmission circuit needs to perform certain processing on the read data before transferring the data to the machine learning device. Optionally, the operation field further includes a function flag bit which is used to indicate operations performed on the read data. The operation field of the data operation signal includes a function flag bit, which indicates that the transmission circuit needs to process the read data according to the function flag. There may be one or a plurality of function flag bits included in the operation field, which is not limited in this embodiment. For example, the function flag bit is an adding decompression flag bit, then if the flag bit is 1, the transmission circuit needs to decompress the read data and transfer the data to a designated MLU in the machine learning device. For another example, the function flag bit is an encryption flag bit, then if the encryption flag bit is 1, the transmission circuit needs to decompress the read data and then transfer the data to a designated MLU in the machine learning device. In this embodiment, the transmission circuit may first perform corresponding processing on the read data according to the function flag bit in the operation field of the data operation signal, and then transfer the data to the machine learning device, so that the machine learning device may immediately identify and perform an operation on the received data, which may improve data processing efficiency and thus greatly improving the access speed of the machine learning chip during data access.

An embodiment of the present disclosure provides a neural network operation device, where the device includes a processor and a memory. The memory stores a computer program, and the processor implements the following steps when executing the computer program:
  receiving a data operation signal sent by an internal or external device, where the data operation signal includes a type flag bit which is used to indicate a broadcast or multicast instruction of the data operation signal; and
  performing a corresponding operation according to the data operation signal on data to be operated in the memory to obtain required input data.

The implementation principles and technical effects of the data processing device provided in this embodiment are similar to those of the foregoing embodiments of the data processing method, which will not be further described herein.

The present disclosure further provides a neural network operation device which includes one or more computation devices mentioned in the present disclosure. The neural network operation device is configured to obtain data to be operated and control information from other processing devices, perform a specified neural network operation, and send an execution result to a peripheral apparatus through an I/O interface. The peripheral apparatus may include a camera, a monitor, a mouse, a keyboard, a network card, a WIFI interface, a server, and the like. When more than one of the above computation devices are included, the computation devices may be interconnected and transfer data to each other through a specific structure. For example, the computation devices may be interconnected and transfer data via a PCIE bus to support neural network operations with a larger scale. In this case, the computation devices may share the same control system, or may have separate control systems. The computation devices may share a memory, or each accelerator may have separate memories. In addition, an interconnection method of the computation devices may be any interconnection topology.

The neural network operation device has good compatibility and may be connected to various types of servers through a PCIE interface.

Figure 7:
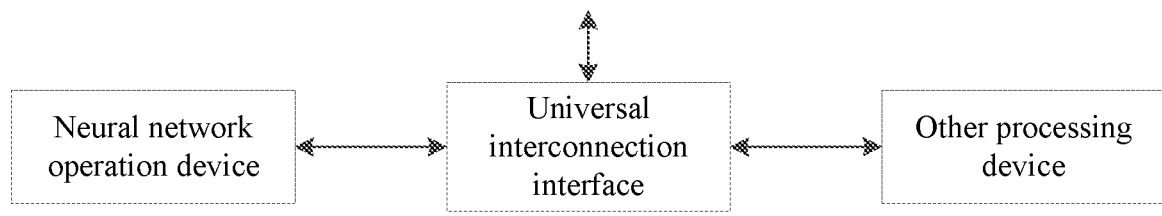
FIG. 7 is a schematic structural diagram of a combined processing device according to an embodiment.

The present disclosure also provides a combined processing device, where the device includes the neural network operation device, a universal interconnection interface, and other processing devices. The neural network operation device interacts with other processing devices to perform operations specified by users. FIG. 7 is a schematic diagram of the combined processing device.

The other processing devices include at least one or more of a general-purpose/special-purpose processors such as a central processing unit (CPU), a graphics processing unit (GPU), a neural network processor, and the like. A count of processors included in the other processing devices is not limited herein. The other processing devices may serve as an interface that connects the neural network operation device to external data and control, including data moving, and may perform the basic control such as starting and stopping the neural network operation device. The other processing devices may also cooperate with the neural network operation device to complete operation tasks.

The universal interconnection interface may be configured to transfer data and control instructions between the neural network operation device and the other processing devices. The neural network operation device may obtain required input data from the other processing devices and write the data in an on-chip storage device of the neural network operation device. The neural network operation device may obtain control instructions from the other processing device, and write the control instructions in an on-chip control cache of the neural network operation device. The neural network operation device may further read data stored in a storage module of the neural network operation device and transfer the data to the other processing devices.

Figure 8:
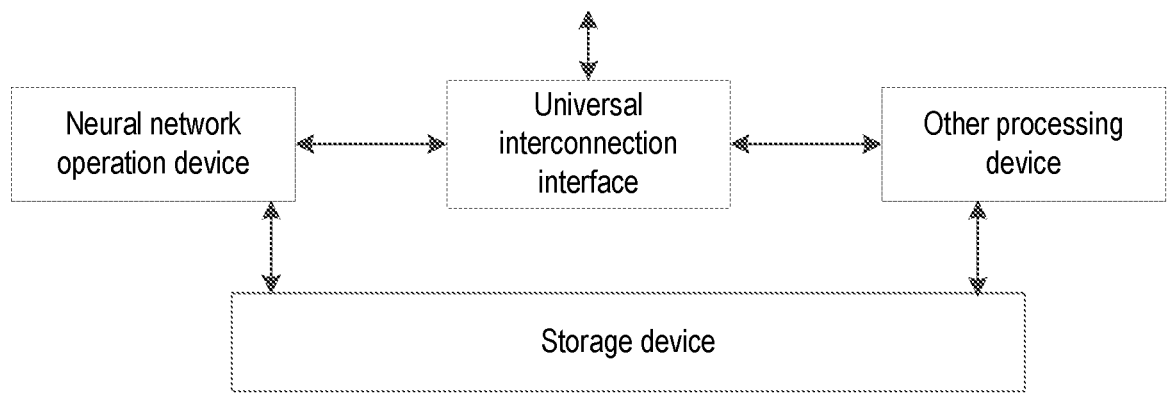
FIG. 8 is a schematic structural diagram of a combined processing device according to another embodiment.

Optionally, as shown in FIG. 8, the structure may further include a storage device, where the storage device is connected to the neural network operation device and the other processing devices respectively, and the storage device is configured to store data of the neural network computation device and the other processing devices. The storage device is configured to store data of the neural network operation device and the other processing devices, and is particularly suitable for a case where data to be operated cannot be completely stored in an internal memory of the neural network operation device or the other processing devices.

The combined processing device may be used as an SOC (System on Chip) of a device such as a mobile phone, a robot, a drone, a video surveillance device, and the like, which may effectively reduce the core area of a control part, increase the processing speed, and reduce the overall power consumption. In this case, a universal interconnection interface of the combined processing device may be connected to some components of the device. The components may include a camera, a monitor, a mouse, a keyboard, a network card, and a WIFI interface.

In some embodiments, the present disclosure provides a chip which includes the above neural network computation device or the combined processing device.

In some embodiments, the present disclosure provides a chip package structure which includes the above chip.

Figure 9:
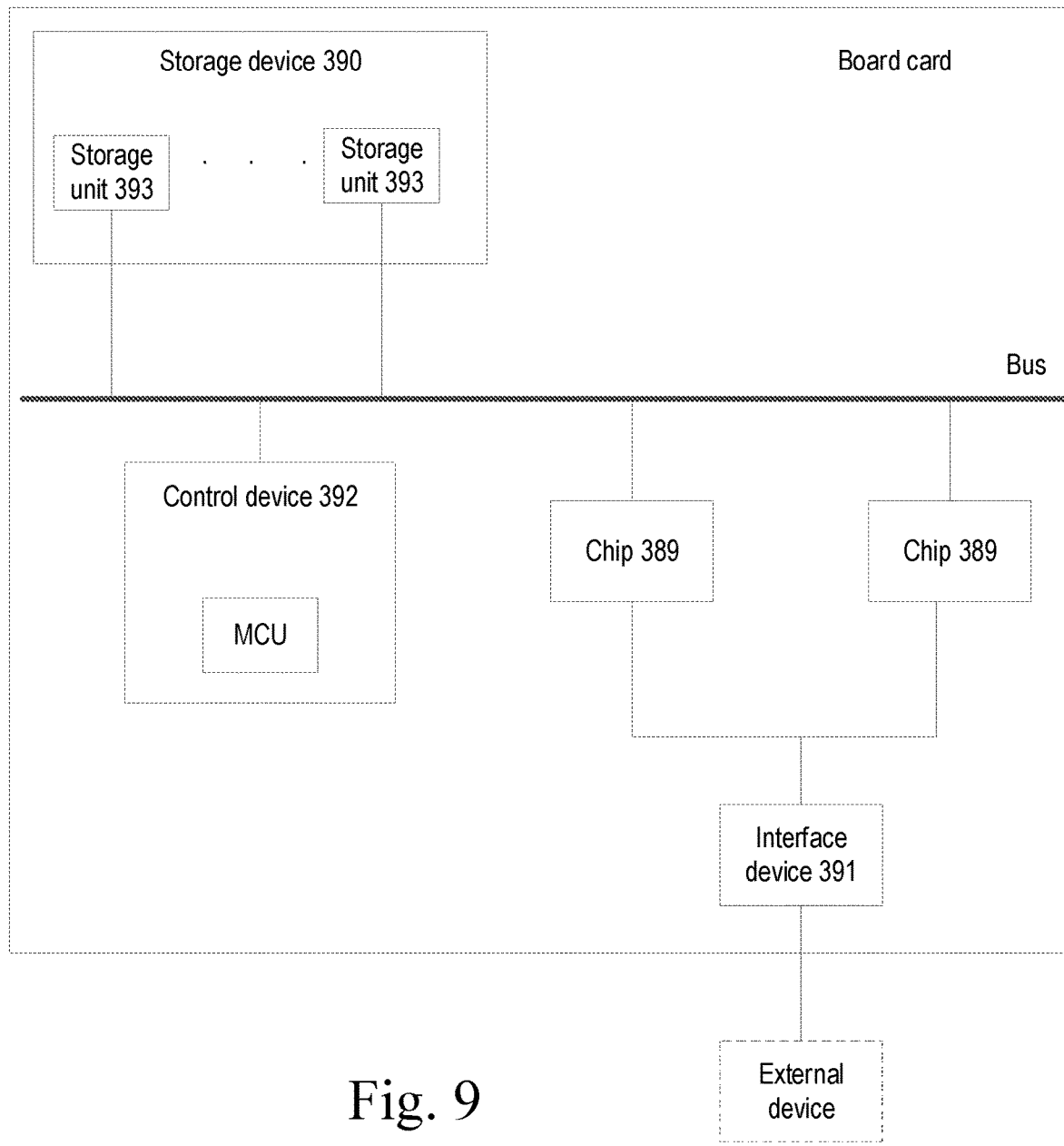
FIG. 9 is a schematic structural diagram of a board card according to an embodiment.

In some embodiments, the present disclosure provides a board card which includes the above chip package structure. FIG. 9 shows a board card which includes the above chip 389 and other supporting components, where the supporting components include and are not limited to: a storage device 390, an interface device 391, and a control device 392;

the storage device 390 is connected to the chip in the chip package structure through a bus for storing data. The storage device may include a plurality of clusters of storage units 393. Each cluster of the storage units is connected to the chip through a bus. It may be understood that each cluster of the storage units may be DDR SDRAMs (Double Data Rate Synchronous Dynamic Random Access Memory).

DDR may double the speed of SDRAM without increasing a clock frequency. DDR allows data to be read on rising and falling edges of a clock pulse. A speed of DDR is twice that of standard SDRAM. In an embodiment, the storage device may include four clusters of the storage units. Each cluster of the storage units may include a plurality of DDR4 particles (chips). In an embodiment, the chip may include four 72-bit DDR4 controllers, where 64 bits in the 72-bit DDR4 controller are used for data transfer and 8 bits are used for ECC verification. It may be understood that when DDR4-31200 particles are used in each cluster of the storage units, a theoretical bandwidth of data transfer may reach 251600 MB/s.

In an embodiment, each cluster of the storage units includes a plurality of DDR SDRAMs arranged in parallel. DDR may transfer data twice in one clock cycle. A controller for controlling the DDR is arranged in the chip to control data transfer and data storage of each storage unit.

The interface device is electrically connected to the chip in the chip package structure. The interface device is configured to implement data transfer between the chip and an external device (such as a server or a computer). For example, in an embodiment, the interface device may be a standard PCIE interface. For example, data to be processed is transferred from the server to the chip through a standard PCIE interface to realize data transfer. Optionally, when a PCIE 3.0×16 interface is used for transfer, a theoretical bandwidth may reach 116000 MB/s. In another embodiment, the interface device may also be other interfaces. A specific representation of the other interfaces is not limited herein, as long as the interface unit can realize a switching function. In addition, a computation result of the chip is still sent back to the external device (such as a server) by the interface device.

The control device is electronically connected to the chip. The control device is configured to monitor a state of the chip. Specifically, the chip and the control device may be electrically connected through an SPI interface. The control device may include a micro controller unit (MCU). For example, the chip may include a plurality of processing chips, processing cores, or processing circuits, and may drive a plurality of loads. Therefore, the chip can be in different working states such as multi-load and light-load. The control device may realize regulation and control of working states of a plurality of processing chips, processing cores and/or processing circuits in the chip.

In some embodiments, the present disclosure provides an electronic device which includes the above board card.

The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

The implementation principles and technical effects of the data processing device provided in this embodiment are similar to those of the foregoing embodiments of the data processing method, which will not be further described herein.

It should be understood that identical or similar parts in the above embodiments may be referred to each other, and for contents not described in detail in some embodiments, please refer to the identical or similar contents in other embodiments.

It should be noted that in the descriptions of the present disclosure, the terms "first", "second", etc., are only used for descriptive purposes, and should not be understood as indicating or implying relative importance. In addition, in the description of the present disclosure, unless otherwise specified, the word "plurality" means "at least two".

It should be understood that any process or method description in the flowchart or described in other ways herein represents one or more modules, segments, or parts of codes of executable instructions configured to implement specific logical functions or steps of the process. In addition, the scope of optional implementations of the present disclosure includes additional implementations, and the functions can be implemented in an order not shown or discussed in the present disclosure, or in a substantially simultaneous manner, or in a reverse order according to the functions involved, which should be understood by those skilled in the art to which the embodiments of this present disclosure belong.

It should be understood that each part of the present disclosure can be implemented by hardware, software, firmware, or a combination thereof. In the above implementations, a plurality of steps or methods can be implemented by using software or firmware stored in a memory and executed by a suitable instruction execution system. For example, if hardware is used for implementation, as in another implementation, the steps can be implemented by any one or more of the following technologies known in the art: a discrete logic circuit with a logic gate circuit configured to implement logic functions on data signals, an application-specific integrated circuit with a suitable combinational logic gate circuit, a programmable gate array (PGA), a field-programmable gate array (FPGA), and the like.

Those of ordinary skill in the art can understand that the entire or part of the flow in the methods as stated in the embodiments can be implemented by a program instructing related hardware, wherein the program may be stored in a computer readable storage medium and may include one or more of the methods as stated in the embodiments during execution.

In addition, the functional units in each example of the present application may be integrated into one processing module, or each of the units may exist separately and physically, or two or more units may be integrated into one module. The integrated module above may be implemented in the form of hardware or software function module. When the integrated module is implemented in the form of a software function module and sold or used as an independent product, the module may be stored in a computer-readable storage medium.

The storage medium may be a read-only memory, a disk, a compact disc, etc.

The term "an embodiment", "some embodiments", "example", "specific example", "some examples", or the like referred to herein means that particular features, structures, materials, or characteristics described in conjunction with the embodiment or the example may be contained in at least one embodiment or example of the present disclosure. In the specification, the schematic descriptions of the above terms do not necessarily refer to the same embodiment or example. In addition, the described specific features, structures, materials, or characteristics can be combined in any one or more embodiments or examples in a suitable manner.

Although embodiments of the present disclosure have been shown and described above, it should be understood that the above embodiments are only exemplary and not intended to limit the disclosure. Any changes, modifications, replacements, and variants of the embodiments can be made within the scope of the disclosure.

The invention claimed is:

1. A data processing method, comprising:
   receiving a data operation signal sent by an internal or external device, wherein the data operation signal includes an operation field and an opcode, the opcode includes a first-type flag bit, and the operation field includes a second-type flag bit, wherein the first-type flag bit is used to indicate whether the data operation signal is an I/O instruction, and the second-type flag bit is used to indicate whether the data operation signal is a broadcast or multicast instruction in the I/O instruction; and
   performing a corresponding operation according to the data operation signal on data to be operated in a memory to obtain required input data,
   wherein the operation field further includes the data reception flag bit which is used to indicate a device or a processing circuit that receives the input data, and
   wherein a count of data reception flag bits represents a count of devices or processing circuits that can interact with the memory.

2. The method of claim 1, wherein the device includes at least one machine learning unit, and each machine learning unit includes a primary processing circuit and a plurality of secondary processing circuits.

3. The method of claim 2, wherein the operation field further includes a jump sub-operation-field, and the jump sub-operation-field includes a jump stride and a jump data length which is obtained after each jump operation is performed, and the reading the memory from the source address to obtain input data that satisfies the data length includes:
   reading the memory from the source address, and obtaining first jump data according to a jump data length after a current jump;
   obtaining a last address of the jump data, and jumping from the last address to a target jump address according to the jump stride; and
   starting from the target jump address, obtaining second jump data according to a length of jump data after the jump until the length of the jump data obtained after each jump satisfies the data length.

4. The method of claim 3, wherein the jump sub-operation-field includes a stride operation field and/or a segment operation field, wherein the stride operation field is used to indicate a stride for each jump of the data operation signal, and the segment operation field is used to indicate a preset size for each segment of the data operation signal.

5. The method of claim 4, wherein the operation field further includes a function flag bit which is used to indicate a processing operation performed on data that is read.

6. The method of claim 5, comprising:
   if a value of the first-type flag bit is I/O, determining that the data operation signal is an I/O instruction, and
   if a value of the second-type flag bit is 1, determining that the data operation signal is a broadcast or multicast instruction in the I/O instruction.

7. The method of claim 6, wherein the receiving a data operation signal sent by an internal or external device includes:
   parsing the data operation signal to obtain a type flag bit of the data operation signal and information of data to be operated; and
   executing the parsed data operation signal according to an instruction queue, where the instruction queue is used to indicate an execution order of the data operation signal.

8. The method of claim 7, wherein before executing the parsed data operation signal according to the instruction queue, the method further includes:
   determining a dependency of adjacent parsed data operation signals to obtain a determination result, where the dependency represents whether there is an association between an $s^{th}$ data operation signal and an $s-1^{th}$ data operation signal before the $s^{th}$ data operation signal; and
   if the determination result is that there is an association between the $s^{th}$ data operation signal and the $s-1^{th}$ data operation signal, caching the $s^{th}$ data operation signal, and after the $s-1^{th}$ data operation signal is executed, fetching the $s^{th}$ data operation signal.

9. The method of claim 8, wherein the determining a dependency of adjacent parsed data operation signals includes:
   obtaining a first storage address interval of required data in the $s^{th}$ data operation signal fetched according to the $s^{th}$ data operation signal, and obtaining a zeroth storage address interval of required data in the $s-1^{th}$ data operation signal fetched according to the $s-1^{th}$ data operation signal, respectively;
   if the first storage address interval and the zeroth storage address interval have an overlapping area, determining that there is a dependency between the $s^{th}$ data operation signal and the $s-1^{th}$ data operation signal; and
   if the first storage address interval and the zeroth storage address interval do not have an overlapping area, determining that there is no dependency between the $s^{th}$ data operation signal and the $s-1^{th}$ data operation signal.

10. The method of claim 1, wherein the operation field further includes information of data to be operated, wherein the information of the data to be operated includes a source address of the data to be operated in the memory, a length of the data to be operated, and a data return address after the data is operated, and the performing a corresponding operation on the data to be operated in the memory according to the data operation signal to obtain the required input data includes:
   reading the memory from the source address to obtain input data that satisfies the data length;
   determining a device or a processing circuit that receives the input data according to the data reception flag bit; and according to the data return address, returning the input data to a storage space corresponding to the data return address in the device or processing circuit.

\* \* \* \* \*